United States Patent [19]

Kikuchi et al.

[11] Patent Number: 4,985,787
[45] Date of Patent: Jan. 15, 1991

[54] MAGNETIC RECORDING APPARATUS FOR POSITIONING MAGNETIC HEAD TO TRACK ON MAGNETIC TAPE

[75] Inventors: Shiego Kikuchi, Tagata; Shinya Nakamura, Fujimidai, both of Japan

[73] Assignee: Tokyo Electric Co., Ltd., Tokyo, Japan

[21] Appl. No.: 293,664

[22] Filed: Jan. 5, 1989

[30] Foreign Application Priority Data

Jan. 8, 1988 [JP] Japan ............................ 63-2081
Jan. 8, 1988 [JP] Japan ............................ 63-2082

[51] Int. Cl.⁵ .................................................. G11B 5/55
[52] U.S. Cl. .................................. 360/78.02; 360/106; 360/77.12
[58] Field of Search ............... 360/88, 106, 78.02, 360/93, 40, 78.01, 77.12, 72.1

[56] References Cited

U.S. PATENT DOCUMENTS 3,979,773  9/1976  Sawazaki et al. ............... 360/106
4,303,953  12/1981 Sanderson ...................... 360/78.02
4,313,143  1/1982  Zarr .............................. 360/106
4,333,116  6/1982  Schoettle et al. ............... 360/78.02
4,378,575  3/1983  Komatsu et al. ................ 360/93
4,394,696  7/1983  Yoshimaru ...................... 360/106
4,446,492  5/1984  Yoshimaru ...................... 360/40
4,468,712  8/1984  Mueller et al. ................. 360/78.02

FOREIGN PATENT DOCUMENTS 438997  4/1968  Japan .
4322027  9/1968  Japan .
4946722  5/1974  Japan .

Primary Examiner—John H. Wolff
Assistant Examiner—Craig A. Renner
Attorney, Agent, or Firm—Oblon, Spivak, McClelland, Maier & Neustadt

[57] ABSTRACT

The magnetic recording apparatus according to the present invention is arranged such that its magnetic head is discretely shifted a pluarlity of times during one revolution of its magnetic tape so that continuous recording or reproduction is performed on a spiral track when the magnetic tape is viewed broadly and it includes a detector portion for detecting a mark every revolution of the magnetic tape so that the start position of a carrier motor is adjusted by the detected signal, and thereby it is achieved to have the tracking accuracy enhanced with an economical structure. Further, the motor for the tape drive portion and the carrier motor are arranged to be independent of each other, so that the angle of rotation of the carrier motor at a time can be increased and the carrier together with the magnetic head can be shifted to a desired track position of a high speed.

4 Claims, 3 Drawing Sheets

MAGNETIC RECORDING APPARATUS FOR POSITIONING MAGNETIC HEAD TO TRACK ON MAGNETIC TAPE

FIELD OF THE INVENTION AND RELATED ART STATEMENT

The present invention relates to a magnetic recording apparatus for recording audio signals onto an endless magnetic tape, such as the recording unit for an telephone answering machine and the recording unit for a teaching machine.

FIG. 3 and FIG. 4 are drawings showing wide endless magnetic tapes 1 which have been cut at an angle with a line vertical to the side edges and then developed.

As one of the conventional recording or reproducing methods, there is one in which the magnetic head is shifted toward the side of the magnetic tape 1 every time the magnetic tape 1 has made one revolution so that the recording or reproduction is performed on a plurality of parallel tracks T as shown in FIG. 3.

There is also such a method in which the magnetic head is continuously shifted toward the side of the magnetic tape 1 while the magnetic tape 1 is running so that the recording or reproduction is performed on one spiral track T as shown in FIG. 4.

In the case shown in FIG. 3, if only the home position of the magnetic head is aligned with the track T, its accurate tracking is achieved by discretely shifting the magnetic head using a motor. However, the recording or reproduction is stopped every time the magnetic tape 1 has made one revolution for the sake of tracking, and therefore, a long message cannot be recorded. Further, there is the need for synchronizing the running of the magnetic tape with the shifting of the magnetic head. Therefore, this method has disadvantages that the controlling of operations becomes complex and the apparatus expensive.

In the case shown in FIG. 4, continuous recording or reproduction is possible since the track T is a continuous single track, but the running of the magnetic tape 1 and the movement of the magnetic head must be synchronized. Therefore, this method has also disadvantages that the controlling of operations becomes complex and the apparatus expensive.

Further, a method set forth in Japanese Laid-open Patent Publication No. 49-46722 is arranged such that the magnetic tape 1 is provided with a start mark $M_1$ and an end mark $M_2$ and the magnetic tape 1 and the magnetic head are relatively shifted by one track pitch during the interval of time corresponding to the distance D between the start mark $M_1$ and the end mark $M_2$. With such an arrangement, the magnetic head is allowed to make a spiral movement on the whole, but there still remains a problem of accuracy of the tracking as to whether the movement of the head for one track pitch can be precisely performed every rotation of the magnetic tape 1.

OBJECT AND SUMMARY OF THE INVENTION

A first object of the present invention is to provide a track of an apparently spiral form.

A second object of the present invention is to provide high tracking accuracy.

A third object of the present invention is to provide capability of quick retrieval of a desired track.

A fourth object of the present invention is to provide controlled, correct start and stopping of the magnetic tape movement.

The present invention comprises a tape drive portion for causing a wide endless magnetic tape to revolve, a carrier retaining a magnetic head in confronted relation with the magnetic tape and movably retained in the direction perpendicular to the revolving direction of the magnetic tape, a power transmission mechanism coupled with the carrier for converting a rotating motion into a linear motion, a carrier motor for discretely driving the power transmission mechanism at intervals of a predetermined period during one revolution of the magnetic tape, and a detector portion connected with a drive circuit for driving the carrier motor and optically detecting a mark formed on the magnetic tape.

With such an arrangement, the magnetic tape is driven to revolve by the tape drive portion. By the power transmission mechanism, the rotation of the carrier motor is converted to a linear motion and it is transmitted to the carrier, and thereby, the carrier together with the magnetic head is shifted in the transverse direction of the magnetic tape. Since the magnetic head is discretely shifted a plurality of times during one revolution of the magnetic tape, recording or reproduction is continuously performed along a spiral track, if the magnetic head is viewed broadly. Further, in using the method of shifting the magnetic head in the tracking direction while the magnetic tape is running, the start position of the carrier motor can be adjusted by a signal from the detector portion detecting the mark every revolution of the magnetic tape, and thus, high tracking accuracy can be provided with an economical structure.

Further, by the arrangement of the carrier motor independently of the motor for the tape drive portion, it becomes possible to increase the angle of rotation of the carrier motor at a time, thereby shifting the carrier together with the magnetic head to a desired track position at a high speed.

The use of a step motor for the carrier motor further enhances the tracking accuracy.

In the present invention, the mark is further made into a home position mark whose length is set to correspond to the period exceeding the sum of the period from starting of the tape drive portion to stabilization of its rotating speed and the period from isolation from the power source of the tape drive portion to its stopping.

Thus, the carrier motor is driven for performing the tracking during the period when the speed of the tape drive portion is stabilized, except for the period during which the home position mark is detected, and therefore, the tracking accuracy can be enhanced with an economical structure and the start and stopping of the magnetic tape can be correctly performed under due control.

DETAILED DESCRIPTION OF THE PREFERRED EMBODIMENTS

Figure 1:
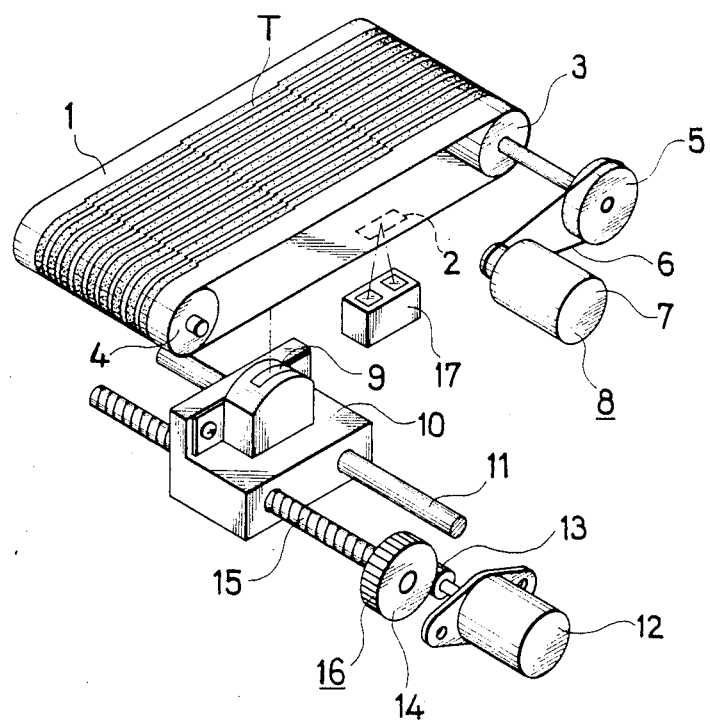
FIG. 1 is an exploded perspective view showing a first embodiment of the present invention.

A first embodiment of the present invention will be described with reference to FIG. 1 and FIG. 2. Referring to the figures, reference numeral 1 denotes a wide endless magnetic tape and this magnetic tape 1 is provided with a mark 2 formed of a tape having a high reflection factor glued onto its circumference. A pair of rollers 3, 4 around which the magnetic tape 1 is wound, a pulley 5 directly coupled with one roller 3 of the pair of rollers, and a D.C. motor 7 as a motor driving a pulley (not shown) transmitting turning effort to the pulley 5 through a belt 6 form a tape drive portion or means 8.

There is a carrier shaft 11 provided parallel to the transverse direction of the magnetic tape 1. A carrier 10 holding a magnetic head 9 in confronted relation with the magnetic tape 1 is slidably put on the carrier shaft 11. Reference numeral 12 denotes a carrier motor for which a step motor is used. A gear 13 directly coupled with the carrier motor 12, a gear 14 in mesh engagement with the gear 13, and a screw 15 fixed to the gear 14 and put in threaded engagement with the carrier 10 form a power transmission mechanism 16. The screw 15 is supported at its both ends by bearings, whereby it is held in parallel with the carrier shaft 11 and fixed so as not to move in the axial direction. Further, there is fixedly provided a detector portion 17 opposing the mark 2 on the magnetic tape 1.

With the described arrangement, driving the D.C. motor 7 causes the magnetic tape 1 to revolve, and driving the carrier motor 12 causes the screw 15 to rotate, and thereby, the carrier 10 together with the magnetic head 9 is shifted in the transverse direction of the magnetic tape 1.

The carrier motor 12 is adapted to be controlled by a drive circuit (not shown) so as to discretely move eight times during one revolution of the magnetic tape 1. Consequently, the carrier 10 together with the magnetic head 9 discretely moves in the transverse direction of the magnetic tape 1 eight times during one revolution of the magnetic tape 1, and thus, continous recording or reproduction along a track T in a spiral form is performed on the magnetic tape 1 if it is viewed broadly. At this time, the shifted distance of the magnetic head 9 in the tracking direction each time is set to one-fifth the width of the track T. Further, since the method to move the magnetic head 9 in the tracking direction while the magnetic tape 1 is running is used, and in addition thereto, the starting position of the carrier motor 12 can be adjusted according to a signal from the detector portion 17 detecting the mark 2 every revolution of the magnetic tape 1, the tracking accuracy can be enhanced with an economical structure.

Further, by the provision of the carrier motor 12 operating independently of the D.C. motor 7 of the tape drive portion 8, the angle of each rotation of the carrier motor 12 can be increased and thereby the carrier 10 together with the magnetic head 9 can be shifted to a desired track position at a high speed.

By the use of a step motor for the carrier motor 12, the tracking accuracy can be further enhanced.

Figure 6:
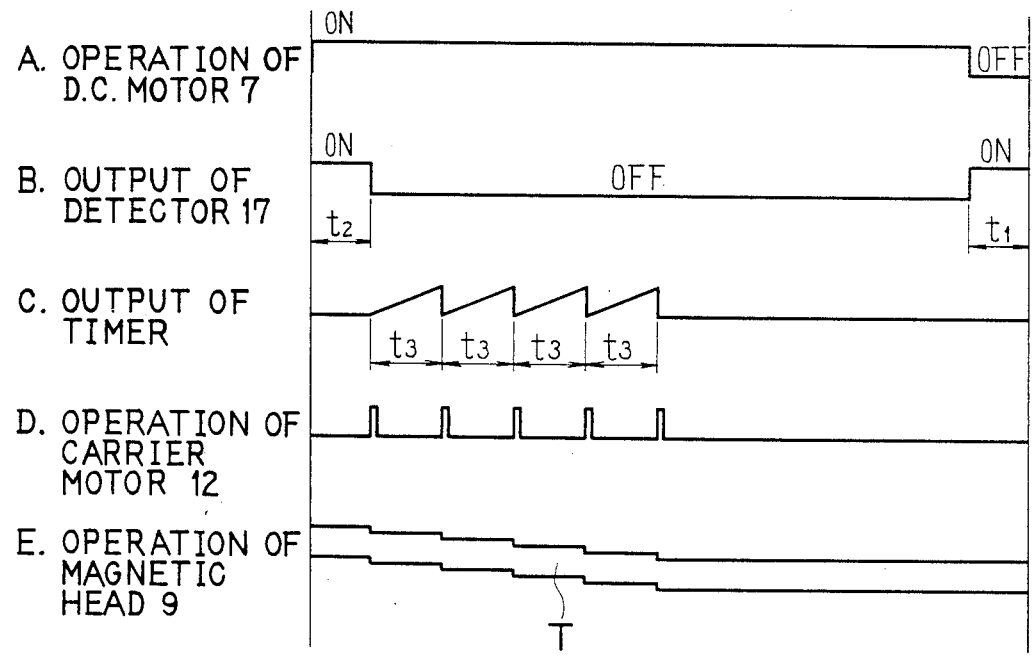
FIG. 6 is a timing chart showing operations in various parts in a second embodiment of the present invention.

Now, a second embodiment of the present invention will be described with reference to FIG. 6. Corresponding parts to those in the above described embodiment are denoted by corresponding reference numerals and explanation thereof are omitted here. The mark 2 in the present embodiment is used as a home position mark whose length is set to the length corresponding to the period exceeding the sum of the period from starting of the D.C. motor 7 to stabilization of its rotating speed and the period from isolation from the power supply of the D.C. motor 7 to its stopping. That is, when a stop instruction is output to a drive circuit (not shown) of the D.C. motor 7, the detector portion or means 17 detects the home position mark 2 and its output goes high as shown in FIG. 6B, and at this timing, the drive current to the D.C. motor 7 is cut off as shown in FIG. 6A. A predetermined period of time $t_1$ later than this time point, the D.C. motor 7 having been rotating by inertia stops together with the magnetic tape 1, and at this point, the detector portion 17 detects a middle position of the home position mark 2. This position is the home position of the magnetic tape 1. Then, upon driving the D.C. motor 7 again from that state wherein the magnetic tape 1 is stopped at the home position, the magnetic tape 1 starts to move, and when a predetermined period of time $t_2$ has passed, the rotating speed of the D.C. motor 7 becomes stabilized. At this time point, the detector portion 17 finishes the detection of the home position mark 2. Then, the length of the home position mark 2 will be corresponding to the period $t_1+t_2$.

There is further provided a timer starting its operation at the point of time at which the detector portion 17 finishes the detection of the home position mark 2 and stops at the timing at which the detector portion 17 starts detecting the home position mark 2 as shown in FIG. 6C. This timer, not shown, is, for example, a function performed by a CPU to which the drive circuit for driving the carrier motor 12 and the detector portion 17 are connected and it serves as the discrete drive means for driving the drive circuit to which the carrier motor 12 is connected at a cycle time of $t_3$.

With such an arrangement, the magnetic tape 1 normally stops, as described above, at the home position, or at the position where the detector portion 17 confronts the middle position of the home position mark 2. When operation is started from this state, the D.C. motor 7 is started with the detector portion 17 in the ON state as shown in FIG. 6B, and when the predetermined period $t_2$ has passed after the D.C. motor 7 was started to rotate and the magnetic tape 1 has thereby started to move, the rotating speed of the D.C. motor 7 becomes stabilized, and the moment the detector portion 17 has passed the home position mark 2 and it is turned OFF, the drive circuit outputs pulses as shown in FIG. 6D to the carrier motor 12 controlled by the outputs of the timer at the cycle time $t_3$ as shown in FIG. 6C. Consequently, the carrier 10 together with the magnetic head 9 discretely moves in the transverse direction of the magnetic tape 1. Thereby, the magnetic head 9 moves relative to the magnetic tape 1 drawing a pattern with steps as shown in FIG. 6E. The quantity of movement of the magnetic head 9 at a time is one-fifth the track width.

Figure 2:
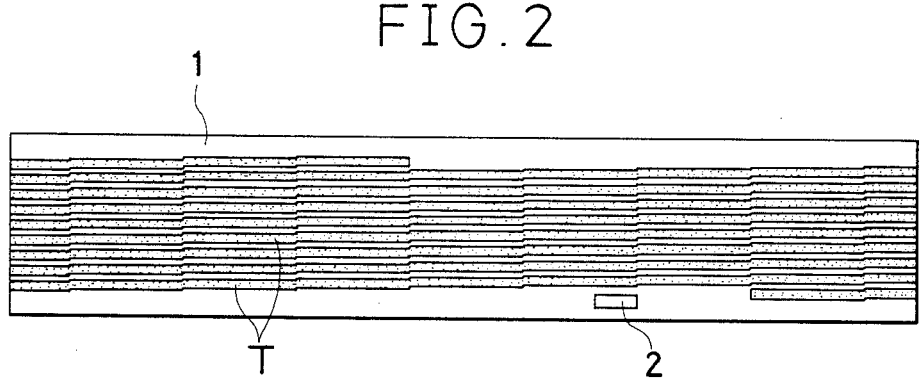
FIG. 2 is a developed view of a magnetic tape showing a track pattern.
Figure 3:
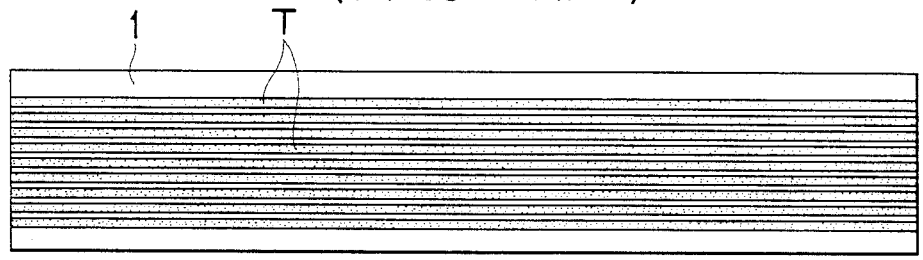
FIG. 3 to FIG. 5 are developed views of magnetic tapes showing conventional track patterns.
Figure 4:
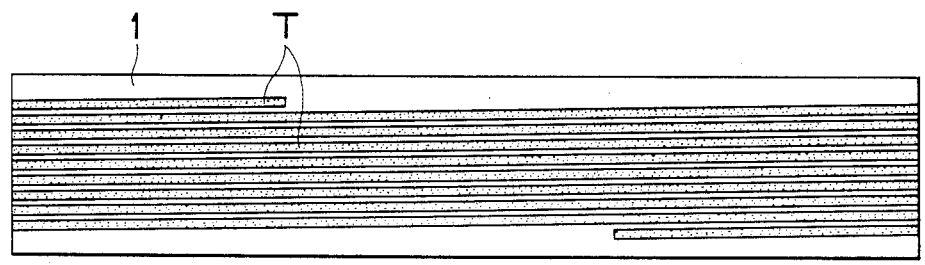
Figure 5:
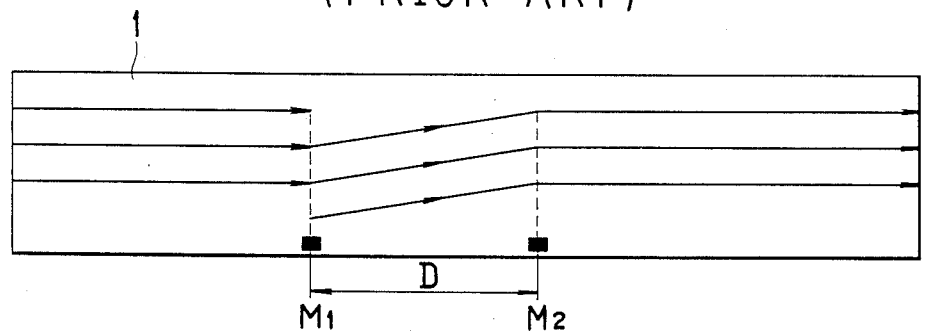

By such an arrangement to have the magnetic head 9 discretely shifted a plurality of times during one revolution of the magnetic tape 1, recording or reproducing is performed on the track T in a spiral form as shown in FIG. 1 when the magnetic tape 1 is viewed broadly. Further, since the method to shift the magnetic head 9 in the tracking direction while the magnetic tape 1 is running is used, and in addition thereto, the operating timing of the carrier motor 12 can be adjusted according to a signal from the detector portion 17 detecting the home position mark 2 of the magnetic tape 1 every revolution of the magnetic tape 1, and besides, the length of the home position mark is set to the length corresponding to the period exceeding the sum of the period from starting of the D.C. motor 7 to stabilization of its rotating speed, $t_2$, and the period from isolation from the power supply of the D.C. motor 7 to its stopping, $t_1$, so that tracking is performed with the carrier motor 12 driven while the speed of the D.C. motor 7 is stabilized, except for the period during which the home position mark 2 is detected, the tracking accuracy can be enhanced with an economical structure.

Besides, by the provision of the timer starting its operation at the point of time when detection of the home position mark 2 by the detector portion 17 is finished and stopping its operation at the point of time when the detection of the home position mark 2 by the detector portion 17 is started, the effective recording length during one revolution of the magnetic tape 1 can be prolonged.

What is claimed is:

1. A magnetic recording apparatus for positioning a magnetic head to track on a magnetic tape comprising:
   a tape drive means for causing a wide endless magnetic tape to revolve in a direction substantially along a longitudinal axis of a magnetic tape;
   a carrier retaining a magnetic head in confronted relation with a magnetic tape for movement in a direction substantially orthogonal to the longitudinal axis of a magnetic tape;
   a carrier motor drivingly connected to said carrier by a power transmission mechanism for converting a rotating motion of said carrier motor into a linear motion to be transmitted to said carrier, said power transmission mechanism including a screw rotated by said carrier motor and in threaded engagement with the carrier;
   a home position mark having a length substantially equal to the sum of a length of a magnetic tape transported during a period from a start of said tape drive means to stabilization of its rotating speed plus a length of a magnetic tape transported during a period from a shut off of said tape drive means to its stopping, said home position mark being formed on said magnetic tape;
   a detector means for optically detecting said home position mark thereby setting a stopping period of said tape drive means; and
   discrete drive means for discretely driving said carrier motor at intervals of a predetermined period during one revolution of the magnetic tape except for a period during which said home position mark is detected to cause the magnetic head of said carrier to track along a magnetic tape in a single continous, substantially spiral track.

2. A magnetic recording apparatus according to claim 4, wherein a motor for said tape drive means and said carrier motor are provided independently of each other.

3. A magnetic recording apparatus according to claim 4, wherein said carrier motor is provided by a step motor.

4. A magnetic recording apparatus according to claim 1, wherein said discrete drive means is adapted to start an operation thereof when the detection of said home position mark by said detector means is finished and to stop the operation thereof upon the detection of said home position mark by said detector means.

* * * * *